United States Patent Office 3,703,567
Patented Nov. 21, 1972

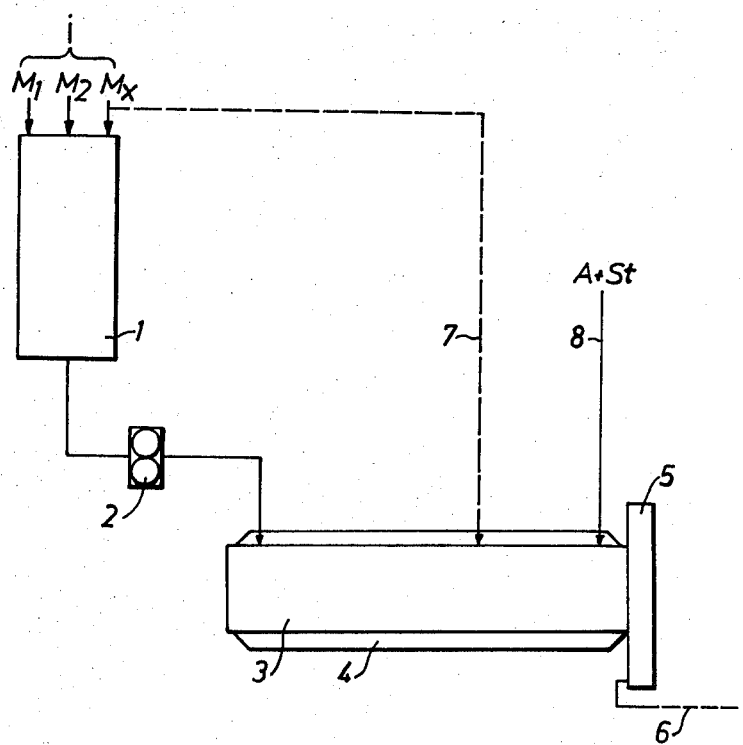

3,703,567
PROCESS FOR THE PRODUCTION OF
SEGMENT COPOLYMERS
Hubert Sutter, Cologne, and Manfred Beck, Schildgen, Germany, assignors to Farbenfabriken Bayer Aktiengesellschaft, Leverkusen, Germany
Filed July 13, 1970, Ser. No. 54,328
Claims priority, application Germany, Aug. 2, 1969,
P 19 39 420.8
Int. Cl. C08f 1/04, 19/08
U.S. Cl. 260—880 B                    4 Claims

ABSTRACT OF THE DISCLOSURE

A process for the continuous solvent-free production of segment compolymers of 1,3-dienes and aromatic vinyl compounds with organolithium initiators in self-cleaning twin-shaft or multiple-shaft screws, wherein a reaction mixture of a 1,3-diolefin, an aromatic vinyl compound and a prepolymer capable of further polymerisation predominantly built up from the 1,3-diolefin, is delivered to the twin-shaft or multiple-shaft screw extruder.

---

Published Netherlands patent application 6906453 (corresponding to U.S. application Ser. No. 812,080 of April 1, 1969) relates to a process for the continuous production of segment copolymers of 1,3-dienes and aromatic vinyl compounds with organolithium initiators, in which the copolymerisation reaction is carried out in the absence of solvents in self-cleaning twin-shaft or multiple shaft screw extruders. The fact that the reaction is carried out in the absence of solvents and the almost complete conversion of the monomers represent the main advantages of this process. The process is generally carried out in self-stripping twin-shaft or multiple shaft screw extruders. By operating in the absence of solvents, it is possible to obtain considerably higher volume-time yields and to avoid all the working-up stages normally involved in solution polymerisation.

It has now been found that the process disclosed in the parent patent can be significantly improved by delivering a reaction mixture comprising a 1,3-diolefin, an aromatic vinyl compound and a prepolymer capable of further polymerisation predominantly built up from the 1,3-diolefin, to the polymerisation screw extruder instead of a mixture of the monomers to be polymerised.

Accordingly, the present invention covers a process for the continuous solvent-free production of segment copolymers of 1,3-dienes and aromatic vinyl compounds with organolithium initiators in self-cleaning twin-shaft or multiple-shaft screw extruders according to German patent application P 1 770 261.3 in which a reaction mixture comprising a 1,3-diolefine, an aromatic vinyl compound and a prepolymer capable of further polymerisation which is predominantly built up from the 1,3-diolefine, is delivered to the twin-shaft or multiple shaft screw extruder.

The volume-time throughput of the polymerisation screw extruder is considerably increased by this improvement in the process.

The prepolymers capable of further polymerisation, known as "living polymers," can be prepared by polymerising a mixture of 1,3-diolefin, aromatic vinyl compound and organolithium initiator in a reaction vessel up to a conversion of 10 to 30%. A polymer consisting predominantly of 1,3-diolefin which contains terminal lithium atoms and which is therefore capable of further polymerisation is formed in this way as is known from the solution polymerisation of these components. The reaction mixture of this prepolymer and the as yet unreacted monomers is then introduced into the polymerisation screw extruder, optionally following the addition of more initiator.

A sealed tube or a sealed reaction vessel equipped with a stirring mechanism, for example, may be used as the reaction vessel for the prepolymerisation reaction. This vessel must be capable of being heated and cooled. In cases where it is desired to carry out the prepolymerisation reaction continuously, its volume should amount to 0.5 to 20 times the free volume of the following polymerisation screw extruder. The prepolymerisation reaction may also be carried out in batches.

The degree of conversion in the prepolymerisation reaction should be in such that the (viscous) prepolymer solution can still be delivered under pressure or by means of a suitable pump into the polymerisation screw extruder. Since the viscosity of the solution is governed not only by the conversion but also by the quantity of initiator and the required Mooney value of the end product and by the composition of the monomer mixture, the required degree of conversion in the prepolymerisation reaction should be determined from case to case. In general, conversions of up to 30% by weight, based on the starting monomer mixture, can still be handled. In any event, the degree of conversion in the prepolymerisation reaction should be lower than the quantity by weight in which the 1,3-diolefin is present in the starting monomer mixture, i.e. segment copolymerisation of the aromatic vinyl monomers should not yet have begun.

The prepolymerisation reaction is easy to carry out continuously. The reaction vessel for the prepolymerisation reaction is continuously filled with the super-cooled initiator-containing monomer mixture of 1,3-diolefin and aromatic vinyl compound. The reaction components can of course also be separately introduced in the required ratio, in which case the initiator may optionally have to be dissolved in the 1,3-diolefin. The required degree of conversion in the prepolymerisation reaction is adjusted through the reaction temperature which in turn must be kept constant during a working cycle by a temperature-controlled heating/cooling system. The reaction temperature is governed not only by the required degree of conversion but also by the average residence time of the reaction mixture in the reaction vessel. It is generally 45 to 55° C., depending upon the residence time and also upon the volume of the reaction vessel. The degree of conversion can of course be varied if necessary during a working cycle by raising or lowering the reaction temperature.

In cases where the prepolymer is prepared in batches, the polymerisation reaction is stopped at the required degree of conversion by quickly cooling the reaction mixture and "frozen" for the purposes of further use.

Examples of suitable 1,3-diolefins include 1,3-butadiene, isoprene and piperylene. Suitable aromatic vinyl compounds include, for example, styrene, 3-methyl styrene, 3-ethyl styrene, 1-vinyl naphthalene, 2-vinyl naphthalene and divinyl benzene. In general, suitable monomer combinations consist of a 1,3-diolefin and an aromatic vinyl compound. It is of course also possible to combine mixture of 1,3-diolefins with an aromatic vinyl compound or mixture of aromatic vinyl compounds with a 1,3-diolefin or mixtures of both classes. 1,3-butadiene and styrene represents a preferred monomer combination.

In general, the 1,3-diolefin and the aromatic vinyl compound are used in a ratio by weight of from 1:10 to 10:1.

Naturally, the monomers or the monomer mixture has to be dried so that the water content of the monomer mixture is less than 20 p.p.m., and preferably less than 10 p.p.m. This is achieved in known manner either by adsorption or azetropically. In addition, steps must be taken to remove other proton-active substances or substances which react with organolithium compounds, especially α-acetylenes in the diene component, in addition to water.

Organolithium compounds suitable for use as initiators correspond to the general formula $R(Li)_x$, in which R represents aliphatic, cycloaliphatic or aromatic radicals or a mono- or poly-unsaturated aliphatic radical of valency $x$, $x$ being an integer of from 1 to 4. The following are mentioned as examples: methyl lithium, isopropyl lithium, n-butyl lithium, sec-butyl lithium, n-decyl lithium, cyclohexyl lithium, phenyl lithium, naphthyl lithium, 4-phenyl butyl lithium, 4-butyl cyclohexyl lithium; 1,4-dilithium butane 1,20-dilithium eicosane, 1,4-dilithium cyclohexane, 1,2-dilithium-1,2-diphenyl ethane, 1,4-dilithium-2-butene, α-ω-dilithium oligo-1,3-dienes of the general formula

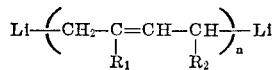

in which $R_1$ and $R_2$ represent H or $R_1$=H when $R_2$=CH$_3$ and vice versa; 1,2,5-trilithium naphthalene, 1,5,10,20-tetralithium eicosane and others. The organolithium initiator is added in quantities of from 0.05 to 5 milliequivalents of Li per 100 g. of monomer mixture, depending upon the monomer ratios and any impurities in the reaction mixture and upon the required molecular size of the copolymers.

The choice of the lithium initiator is governed not only by solubility and reactivity but also by the required segment sequence in the copolymer. If AAAA is the polymer segment consisting predominantly of 1,3-diolefin, BBBB the polymer segment of the aromatic vinyl compound and $R^nLi_n$ the organolithium initiator of functionally $n$ ($n$ represents the valency of the radical R and the number of lithium atoms and is preferably from 1 to 4), block copolymers of Formula I are obtained with a monofunctional initiator (R'Li), block copolymers of Formula IIa with a bifunctional initiator (R''Li$_2$) and block copolymers of Formula IIIa with a trifunctional initiator (R'''Li$_3$) and so on:

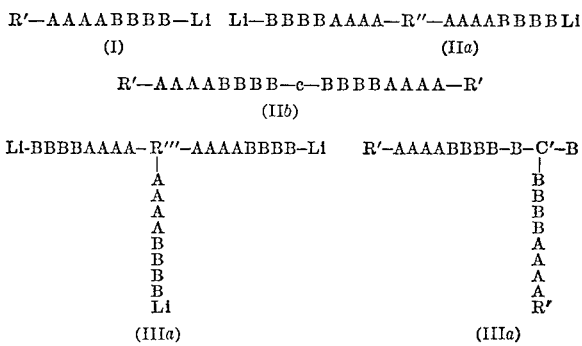

If it is desired to reverse the segment sequence according to Formulae IIb and IIIb, a plurality of block copolymers of Formula I are coupled with a bifunctional or polyfunctional coupling agent ($c$, $c'$) [see below]. As explained in the parent patent, reversal of the segment sequence can also be achieved through a process step.

The process according to the invention can also be used in cases where the segment lengths in the copolymer are shortened by the addition of small quantities of ether to the polymerisation mixture through a more or less statistical distribution of the monomers.

The way in which the process according to the invention is carried out is described in detail in the following with reference to the embodiment shown in the accompanying drawing. The monomers, 1,3-diolefin $M_1$, aromatic vinyl compound $M_2$ and optionally one or more monomers $M_x$ from these classes of compounds are introduced into a preliminary reactor 1 either in the form of a cooled mixture of specific composition in which the initiator (I) is dissolved, or individually in a specific ratio, in which case the initiator is dissolved in the 1,3-diolefin The preliminary reactor is equipped with an effective stirrer and with a heating and cooling system regulated through the reaction temperature. The "living" prepolymer-monomer mixture is delivered into a polymerisation extruder screw 3 by means of a gear pump 2, the rate of delivery being adjusted to the quantity in which the monomers are introduced into the preliminary reactor. The polymerisation screw extruder is a self-stripping twin-shaft screw extruder. The screw shafts of chrome steel which rotate in the same direction are double-threaded and mesh with one another. Their external diameter is 32 mm. and their core diameter 24 mm. with a pitch of 12 mm. The screw extruder has a free reaction volume of around 450 ml. The rotational speed of the screw shafts is variable and is adjusted in such a way that the feed corresponds substantially to the volume introduced. The screw housing is provided with a (compartmented) heating/cooling jacket 4 in which circulates a regulatable, heating and cooling medium in such a way that a specific, generally increasing temperature profile is adjusted in the delivery direction of the polymerisation screw extruder. The temperature prevailing in the reaction zone is controlled by a plurality of temperature detectors. In order to stop and to stabilise the copolymerisation reaction, a combined stopping agent and stabiliser (A+St) is introduced through a pipe 8 into approximately the last quarter of the polymerisation screw extruder. The conversion obtained in the polymerisation reaction is normally complete. The hot rubber issues from a die plate, is granulated in a granulator 5 and sprayed with water for cooling purposes. The superficially moist granulate is dried on a ventilated vibrating screen 6.

The procedure described above can of course be varied as required within the scope of the invention. For example, part of the monomer(s) can be delivered through a pipe 7 elsewhere into the polymerisation screw extruder in order to obtain a different segment sequence. In addition, the stopping agent can be replaced by a polyfunctional coupling agent in order in this way to attach the "living" chain ends.

The process according to the invention is illustrated by the following examples. The parts indicated are parts by weight unless otherwise stated.

EXAMPLES 1 TO 3

The test arrangement is as shown in the accompanying drawing. A mixture of 65 parts of 1,3-butadiene, 35 parts of styrene and 0.14 part of n-butyl lithium is accommodated in a brine-cooled mixing vessel. The quantity of initiator-containing monomer mixture specified in Table 1 is continuously introduced into the preliminary reactor under stationary test conditions. The degree of conversion in the preliminary reactor is kept constant at around 20 to 23% through the reaction temperature (47° C. to 50° C.). The prepolymer/monomer mixture is continuously transferred at a rate corresponding to the quantity in which the monomer is introduced from the preliminary reactor to the polymerisation screw where polymerisation of the reaction mixture is completed. The conversion is substantially quantitative. The copolymer is stopped and stabilised in the screw with 1% of stearic acid and 0.5% of 2,6-ditertiarybutylparacresol. The test data and a few results are set out in Table 1.

TABLE 1

| | Monomer mixture, l./h. | RZD,[1] l./lh. | Temp.,[2] °C. | Mooney viscosity, ML-4'[3] | Total styrene, percent[4] | Block styrene, percent[5] |
|---|---|---|---|---|---|---|
| Example: | | | | | | |
| 1 | 3.15 | 7 | 60→85 | 43-49 | 34.8 | 27.0 |
| 2 | 3.6 | 8 | 65→90 | 45-50 | 35.1 | 26.2 |
| 3 | 4.05 | 9 | 65→100 | 46-49 | 35.0 | 26.0 |

Example:
[1] The volume-time throughput (RZD) is based on the reaction volume of the polymerisation screw.
[2] Temperature profile in the direction of product flow.
[3] Limit values in a uniform working period.
[4] Measured in UV.
[5] Determined by degradation through oxidation in accordance with British Pat. No. 888,624.

The examples show that the volume-time throughput can be considerably increased by the process according to the invention as compared to Netherlands patent application 6906453.

We claim:

1. A process for the continuous solvent-free production of segment copolymers which comprises feeding a mixture of 1,3-diene, an aromatic vinyl compound, a catalytic amount of a hydrocarbon lithium compound and a prepolymer predominantly based on said 1,3-diene obtained by partially polymerizing a 1,3-diene and an aromatic vinyl compound mixture with a hydrocarbon lithium compound into a self-cleaning, multiple shaft screw extruder and continuously removing resultant segment copolymer from the screw extruder at a rate commensurate with the rate of said feed.

2. The process of claim 1 wherein said prepolymer is prepared by polymerizing a mixture of 1,3-diolefin, an aromatic vinyl compound and an organo lithium initiator to a conversion percentage of from 10 to 30%.

3. The process of claim 1 wherein the prepolymer is formed continuously and the volume of the reaction zone for prepolymerization is from 0.5 to 20 times the free volume of said screw extruder.

4. The process of claim 1 wherein said 1,3-diolefin and aromatic vinyl compound are used in a ratio by weight of from 1:10 to 10:1.

References Cited

UNITED STATES PATENTS

| 3,030,346 | 4/1962 | Cooper | 260—83.7 |
| 3,094,512 | 6/1963 | Short | 260—83.7 |
| 3,198,774 | 8/1965 | Huxtable et al. | 260—83.7 |
| 3,254,053 | 5/1966 | Fisher et al. | 260—67 |
| 3,343,922 | 9/1967 | Zimmer et al. | 23—285 |
| 3,464,961 | 9/1969 | Foster | 260—83.7 |
| 3,558,575 | 1/1971 | Keckler | 260—83.7 |

JAMES A. SEIDLECK, Primary Examiner

U.S. Cl. X.R.

260—83.7, 94.2 M, 95 C